No. 804,730. PATENTED NOV. 14, 1905.
H. M. JORDAN.
MACHINE FOR DIPPING SHEEP, &c.
APPLICATION FILED MAR. 31, 1905.

Witnesses
Milton C. Lenoir
Watts T. Estabrook

Inventor
Horace M. Jordan
by Thesa J. DuBois
Leo, Attorneys.

UNITED STATES PATENT OFFICE.

HORACE M. JORDAN, OF WINFIELD, IOWA.

MACHINE FOR DIPPING SHEEP, &c.

No. 804,730.     Specification of Letters Patent.     Patented Nov. 14, 1905.

Application filed March 31, 1905. Serial No. 253,085.

*To all whom it may concern:*

Be it known that I, HORACE M. JORDAN, a citizen of the United States, residing at Winfield, in the county of Henry and State of Iowa, have invented certain new and useful Improvements in Machines for Dipping Sheep, &c., of which the following is a specification.

My invention relates to an improvement in machines for dipping sheep, goats, and other animals; and the object is to provide means for facilitating and expediting this operation; and it consists, primarily, in a tank having a pivotally-suspended elevating-floor therein adapted to receive the animal and means for lowering it to submerge the animal in the washing fluid, after which to raise it therefrom and admit of the introduction of another animal, &c.

With the foregoing in view my invention further consists in certain novel features of construction and combinations of parts, which will be hereinafter described, and pointed out in the claims.

Figure 1:
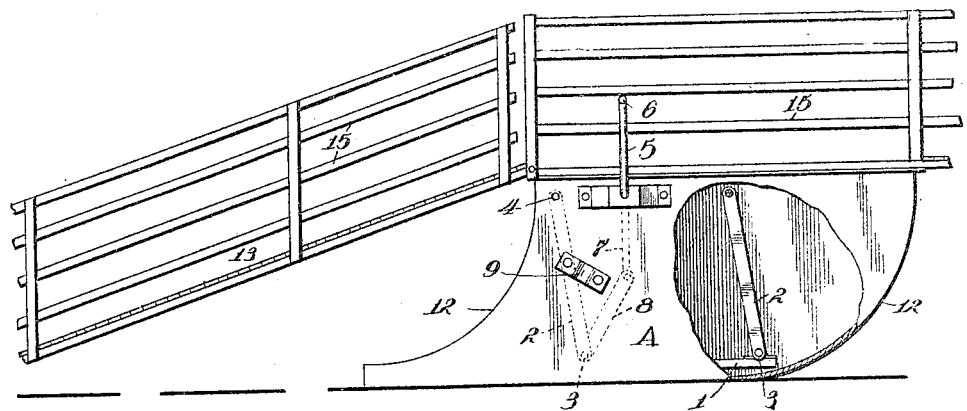
Figure 2:
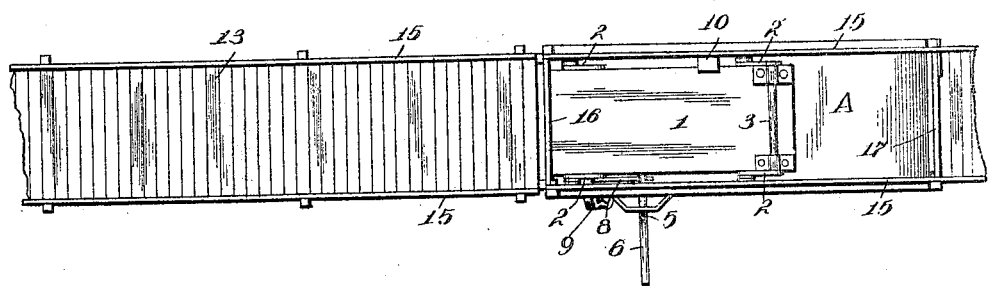

In the accompanying drawings, Figure 1 is a side elevation partly in section, and Fig. 2 is a plan view, of the tank.

A represents a tank adapted to contain liquid or "dip," as it is usually called. This is preferably relatively narrow and long to prevent the animal from turning and getting caught therein. An elevator or floor 1 is suspended therein by means of links 2 2 and bolts or equivalent devices 3 3, secured to the elevator or floor, these links being pivoted at their lower ends to the bolts and at their upper ends to studs 4 4 or similar means within the tank. A crank 5 is journaled in the side of the tank within reach of the operator and has a handle 6 at the outer end to be grasped whereby to rock the same, and at the inner end it is provided with an arm 7, and a connecting-rod 8, pivoted to the end of this arm, extends to the floor or elevator, being preferably pivoted to the bolt 3 nearest the center thereof. By turning this crank to the left about a half-revolution the elevator or floor is raised and maintained horizontally to the upper level of the tank in position to receive the animal to be washed or "dipped." By reversing the crank the floor or elevator is lowered to the bottom of the tank to immerse the animal, after which the crank is turned back again, lifting the animal from the bath.

A catch 9 at the side is provided for fastening the crank, if desired, when the floor or elevator is lifted. A stop 10 inside prevents the floor or elevator rising above a given point. The ends of the tank are preferably curved, as at 12 12, in the arc of a circle which the ends of the floor or elevator described in ascending or descending, and in this way the interior of the tank corresponds in dimension approximately to the horizontal positions of the floor or elevator, so that no space is left to receive or catch the foot or feet of the animals being washed or dipped.

To facilitate handling the animals, an inclining chute 13 is provided, which leads from the corral to the top of the tank, and the sides of the chute, as well as the tank, are provided with fence-rails 15 15 and gates 16 and 17 to confine the animals preparatory to being dipped. After the operation the gate to the right is opened and the animal permitted to pass on out of the way.

It is evident that slight changes might be resorted to in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. A tank for dipping sheep and other animals, comprising sides, bottom and curved ends, a floor or elevator suspended therein, and means for raising and lowering it in the arc of a circle, whereby it forms a horizontal closure with the side and end walls of the tank at every point of its elevation, thus preventing the formation of spaces at any time to catch the feet of the animals being dipped.

2. The combination with a tank, of a floor or elevator, links pivotally connected with the latter and to the tank, a crank journaled in the tank and having an arm on its inner end and a connecting-rod extending from the arm to the floor or elevator.

3. The combination with a tank, of a floor or elevator, links pivotally connected with the latter and to the tank, a crank journaled in the tank and having an arm on its inner end, a connecting-rod extending from the arm to the floor or elevator, and a catch for fastening the crank.

4. The combination with a tank, a chute, fences and gates, of a pivotally-suspended floor or elevator within the tank, and means for raising and lowering the latter in a horizontal position.

In testimony whereof I affix my signature in presence of two witnesses.

HORACE M. JORDAN.

Witnesses:
S. W. LIVINGSTON,
A. S. FOLGER.